Patented Jan. 6, 1953

2,624,653

UNITED STATES PATENT OFFICE 2,624,653

METALLIZED ORTHO-HYDROXY, ORTHO-AMINO MONOAZO DYESTUFFS AND THEIR USE IN DYEING NYLON

Heinrich H. Bestehorn, Easton, Pa., and Jack F. Morgan, Phillipsburg, N. J., assignors to General Aniline & Film Corporation, New York, N. Y., a corporation of Delaware No Drawing. Application December 3, 1947, Serial No. 789,558

4 Claims. (Cl. 8—42)

This invention relates to new metallized ortho-hydroxy, ortho-amino monoazo dyestuffs, which dyestuffs are capable of dyeing nylon (linear polyamide) in deep shades.

Apart from the qualities of the dyeing, it is known that nylon may be dyed with most dyestuffs which dye wool. Among such, the metallized, water-soluble, acid, monoazo dyestuffs have been recommended for the purpose. However, as it is also known, these dyestuffs have certain drawbacks for the dyeing of nylon, the dyeing being not as deep as might be desired and of limited fastness to light and washing.

We have now found a group of new metallized ortho-hydroxy, ortho-amino monoazo compounds which are outstanding in their properties as dyestuffs for nylon. The new compounds are free from sulfonic acid groups and are further characterized by containing a single carboxy group, which group is located in the coupling component in non-ortho position to the azo bridge, i. e., in nonchelating position. The new compounds have the probable general formula:

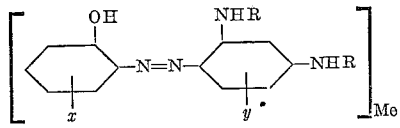

wherein R is hydrogen or a carboxyalkyl radical which may be carboxymethyl, 2-carboxyethyl or 3-carboxypropyl, R being once the carboxyalkyl radical, $x$ is hydrogen or an alkyl, alkoxy, halogen or nitro group, $y$ is hydrogen or an alkyl or alkoxy group, and Me is a metal in complex combination with the azo bridge, which metal may be chromium, copper, cobalt or nickel.

The new dyestuffs are capable of dyeing nylon in deep shades of excellent fastness to light and washing, the carboxy group promoting affinity of the dyestuffs for nylon. They are not as soluble in water as the known metallized acid monoazo dyestuffs carrying a sulfonic acid group, yet their solubility is sufficient such that no dispersion is necessary for their application to the fiber. At higher temperatures their solubility is greatly increased.

In contradistinction to the aforementioned metallized acid monoazo dyestuffs carrying a sulfonic acid group, the new dyestuffs have excellent build-up properties for nylon and are generally superior thereto in the wash-fastness of the nylon dyeings. The new dyestuffs are in the same respects superior to the unsulfonated metallized monoazo dyestuffs which, in the one instance, contain a chelated carboxy group and, in the other, a plurality of carboxy groups but none in chelation. They are further distinguished from the aforementioned dyestuffs containing a chelated carboxy group in possessing better stability in acid bath and better exhaust. They are, moreover, similar enough in their dyeing properties to the dyestuffs now used in the trade to allow dyeings to be made on nylon with a mixture of the old with the new dyestuffs.

The new compounds may be prepared in the way known for the manufacture of metallized orthohydroxy, orthoamino monoazo dyestuffs. An unsulfonated orthoaminophenol, unsubstituted, or substituted in the nucleus by an alkyl, e. g., methyl, ethyl, an alkoxy, e. g., methoxy, ethoxy, a halogen, e. g., chlorine, or a nitro group, is diazotized and coupled in neutral or weakly acid medium with a diamino compound of the general formula:

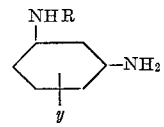

wherein R is a carboxy alkyl radical which may be —CH$_2$COOH, —CH(CH$_3$)COOH and

—C(CH$_3$)$_2$—COOH and $y$ is hydrogen or an alkyl radical, e. g., methyl, ethyl, or an alkoxy radical, e. g., methoxy, ethoxy and the like. The resulting ortho-hydroxy, ortho-amino monoazo dyestuff is then metallized.

Suitable ortho-aminophenol compounds for the diazo component of the dyestuffs are, for example, 2-aminophenol, 1-methyl-2-hydroxy-3-aminobenzene, 1-methoxy-3-hydroxy-4-aminobenzene, 1-ethoxy-3-hydroxy-4-aminobenzene, 4-chloro-2-aminophenol, 4,6-dichloro-2-aminophenol, 4-nitro-2-aminophenol, and the like.

Diamino compounds suitable as coupling components for the dyestuffs are, for example, 3-aminophenyl glycine, 5-amino-2-methylphenyl glycine, 5-amino-4-methylphenyl glycine, 3-amino-5-methylphenyl glycine, 5-amino-6-methylphenyl glycine, 3-amino-6-methylphenyl glycine, 3-amino-5-methoxyphenyl glycine, 3-amino-6-methoxyphenyl glycine, 5-amino-4-methoxyphenyl glycine, 5-amino-6-methoxyphenyl glycine, 5 - amino - 4,6 - dimethylphenyl glycine, 5-amino-3,6-dimethylphenyl glycine, 3-amino-2,6 - dimethylphenyl glycine, 3 - amino - 5,6-dimethylphenyl glycine, 3-amino-4,5-dimethylphenyl glycine, 3-amino-5-ethoxyphenyl glycine, 3-amino-6-ethoxyphenyl glycine, 5-amino-4-ethoxyphenyl glycine, and the corresponding homologs thereof wherein the carboxy alkyl radical is respectively, 2-carboxyethyl and 3-carboxypropyl, and the like.

Coupling compounds for the new dyestuffs can be obtained by reduction of the corresponding nitro derivative, for example, m-nitrophenyl glycine to m-aminophenyl glycine, Beilstein 4th Ed. XIII (15), and 5-nitro-2-methylphenyl glycine to 5-amino-2-methylphenyl glycine, ibid (42). Meta-amino alkylanilido and m-amino alkoxyanilido acetic, propionic and butyric acids can be obtained by condensing in known way the corresponding m-nitro alkyl anilines and m-nitro alkoxy-anilines with, respectively, chloroacetic acid, α-chloro-propionic acid and α-chloro-isobutyric acid, with subsequent reduction of the nitro group to form the amine.

The coupling is done in neutral or weakly acid medium in the usual manner for amino type couplers. Inasmuch as the diamino coupling compounds employed contain two amino groups which activate the para positions thereto, it is believed that the coupling takes place in either of these para positions if both of them are unoccupied by a substituent group $y$; the result being a formation of a mixture of the isomeric monoazo dyestuffs of the probable general formula:

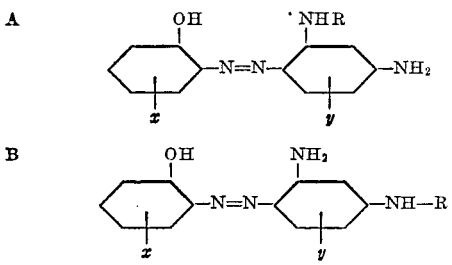

wherein R, $x$ and $y$ have the significance aforesaid.

Dyestuffs of the invention which correspond to Formula A wherein the coupling is exclusively in para position to the unsubstituted amino group can be obtained by employing a coupling compound in which the para position to the substituted amino group is occupied by an alkyl or alkoxy group. For example, 5-amino-4-methylphenyl glycine, 5-amino-4,6-dimethylphenyl glycine, 5-amino-4-methoxyphenyl glycine, 5-amino-4-ethoxyphenyl glycine, and the like.

Dyestuffs of the invention which, on the other hand, correspond to Formula B wherein the coupling is exclusively in para position to the substituted amino group (ortho to the NH2 group), can be obtained by employing a coupling compound in which the para position to the unsubstituted amino group is occupied by an alkyl or alkoxy group, for example, 5-amino-2-methylphenyl glycine, 3-amino-2,6-dimethylphenyl glycine, 3-amino-6-methoxyphenyl glycine, 3-amino-6-ethoxyphenyl glycine, and the like.

Metallization of the ortho-hydroxy, ortho-amino monoazo dyestuffs can be carried out by any of the methods known in the art. Depending upon the metal employed and the constitution of the dyestuff, it may be accomplished in alkaline, neutral or acid medium. While we prefer to carry out the metallization in an aqueous medium, it can also be effected in an organic solvent, as for example, alcohol, or in mixtures of such solvents with one another or with water.

The dyeing of nylon with the new compounds can be carried out in a neutral or preferably a slightly acid bath. The dyeing can be carried out at temperatures in the dyebath of about 190° F. to the boiling point. For acidification of the dyebath there can be used, acetic, formic and the like acids. Advantageously, substances which in aqueous solution dissociate on heating to liberate free acid, e. g., ammonium thiocyanate, diethyl tartrate and the like, can also be employed for the acidification of the dyebath. A specific illustration of the mode of dyeing nylon with the new dyestuffs is as follows. A solution of one of the new dyestuffs is prepared by heating to the boiling point 0.15 part of the dyestuff with 300 parts of water containing suitable surface active agent, e. g., approximately 0.1% of the oleic acid amide of methyl taurine, sodium salt. Five parts of nylon is entered into the hot dyebath and heating continued. After 15 minutes, 5 parts of 1% acetic acid solution is added and a like amount after another 15 minutes, the bath being slightly acid after these additions, i. e., it contained about 0.03% of the acid. After about 1 hour total heating time the nylon is removed from the dyebath, rinsed in warm water, and soaped by immersing it in a hot solution of 5 parts of a 10% green soap solution in 300 parts of water. The dyed nylon is again rinsed and then dried and conditioned in the usual manner.

The invention is further illustrated by the following specific examples to which, however, it is not intended that it be limited.

*Example*

15.4 grams of 4-nitro-2-aminophenol is dissolved in 300 ml. of water and 25 ml. of conc. hydrochloric acid, cooled and diazotized in the usual way by treatment with 6.9 grams of sodium nitrite as 30% solution. The diazo suspension is added to a solution of 17 grams of 3-aminophenyl glycine dissolved in 800 ml. of water and 12 ml. of conc. hydrochloric acid. Sodium acetate as 20% solution is then added until the mixture is nearly neutral to Congo red paper and stirring is continued until the coupling reaction is complete. The monoazo dye is removed by filtration, resludged in 700 ml. of water and 150–200 ml. of conc. ammonium hydroxide, stirred a few minutes, and treated with 27 grams of nickelous sulfate crystals dissolved in 200 ml. of water. After stirring for 4 hours at a temperature of 50–60° C., the nickel dye is removed by filtration, dried and ground to a fine powder. It dyes nylon from acid bath a brown shade and is a mixture of the nickel complex of the monoazo dye of the probable formula:

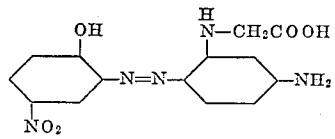

and the nickel complex of the isomeric dye of the probable formula:

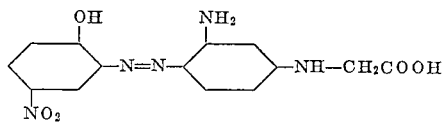

The copper and cobalt complexes of the monoazo dyestuff, which dye nylon in various shades, are obtained by substituting for the nickelous sulfate an equivalent amount of copper sulfate and cobaltous chloride, respectively. The chromium metal complex may be obtained by resludging the dye paste in 700 ml. water with chromium formate and heating in a pressure vessel at 135° C. for 4 hours.

We claim:

1. A metallized ortho-hydroxy, ortho-amino monoazo dyestuff of the general formula:

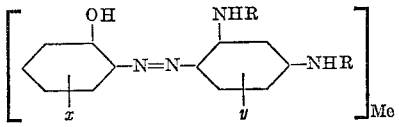

wherein R is a member selected from the group consisting of hydrogen and the carboxyalkyl radicals, carboxymethyl, 2-carboxyethyl and 3-carboxypropyl, R being only once the carboxyalkyl radical, $x$ is a member selected from the group consisting of hydrogen and the lower alkyl, lower alkoxy, halogen and nitro radicals, $y$ is a member selected from the group consisting of hydrogen and the alkyl and alkoxy radicals, and Me is a metal in complex combination with the azo bridge and selected from the group consisting of copper, cobalt and nickel.

2. The nickel complex of the ortho-hydroxy, ortho-amino monoazo dyestuff of the formula:

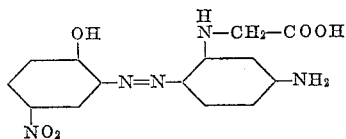

3. The nickel complex of the ortho-hydroxy, ortho-amino monoazo dyestuff of formula:

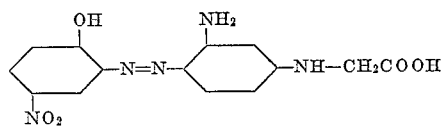

4. A method for dyeing nylon which comprises applying thereto in a slightly acid bath a metallized ortho-hydroxy, ortho-amino monoazo dyestuff of the general formula:

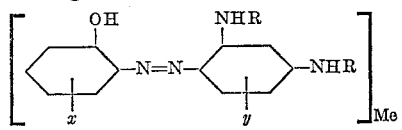

wherein R is a member selected from the group consisting of hydrogen and the carboxyalkyl radicals, carboxymethyl, 2-carboxyethyl and 3-carboxypropyl, R being only once the carboxyalkyl radical, $x$ is a member selected from the group consisting of hydrogen and the lower alkyl, lower alkoxy, halogen and nitro radicals, $y$ is a member selected from the group consisting of hydrogen and the alkyl and alkoxy radicals, and Me is a metal in complex combination with the azo bridge and selected from the group consisting of copper, cobalt and nickel.

HEINRICH H. BESTEHORN.
JACK F. MORGAN.

REFERENCES CITED

The following references are of record in the file of this patent:

UNITED STATES PATENTS

| Number | Name | Date |
|---|---|---|
| 658,506 | Ott et al. | Sept. 25, 1900 |
| 2,277,551 | Kirst | Mar. 24, 1942 |
| 2,374,106 | Kvalnes | Apr. 17, 1945 |

OTHER REFERENCES

Ser. No. 391,542, Mueller et al. (A. P. C.), published Apr. 27, 1943.

Choquette, American Dyestuff Reporter, page 213, May 21, 1945.

Grundy, J. Soc. Dyers and Colorists, August 1944, page 208.

Silk Journal and Rayon World, May 1944, page 40.